No. 873,092. PATENTED DEC. 10, 1907.
T. ROMMEL.
COUPLING ROD FOR THE AXLES OF AUTOMOBILES.
APPLICATION FILED SEPT. 6, 1906.
_FIG_1_
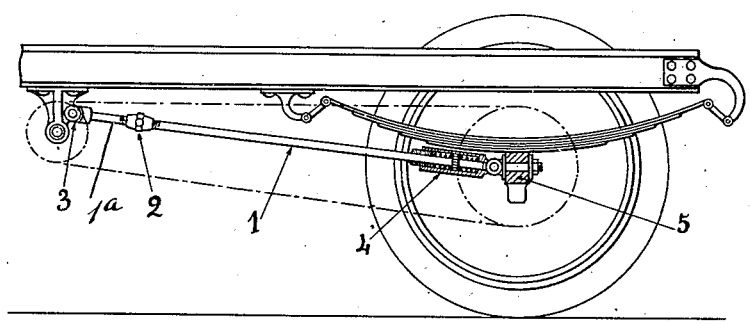
_FIG_2_
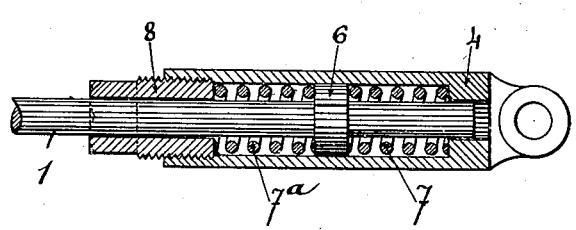
Witnesses
A. J. Haddan
S. Ford
Inventor
Theodore Rommel
by his Attorney H. Haddan

UNITED STATES PATENT OFFICE.

THÉODORE ROMMEL, OF NEUILLY-SUR-SEINE, FRANCE.

COUPLING-ROD FOR THE AXLES OF AUTOMOBILES.

No. 873,092.  Specification of Letters Patent.  Patented Dec. 10, 1907.

Application filed September 6, 1906. Serial No. 333,458.

*To all whom it may concern:*

Be it know that I, THÉODORE ROMMEL, engineer, a citizen of the French Republic, and residing at Neuilly-sur-Seine, France, have invented a Coupling or Tension Rod for the Axles of Automobiles, of which the following is a specification.

The present invention relates to an improvement in coupling or tension rods for connecting the rear axle of an automobile to a fixed point of the frame and the purpose thereof is to absorb the strains due to shocks imparted to the wheels by inequalities in the road surface. In the absence of said coupling rods the springs of the vehicles alone minimize said shocks and since said springs absorb vibration in the vertical direction only they do not operate under the best conditions. Hitherto ordinary rods or shafts were employed which did not fulfil the required conditions.

The improvements consist in applying a double spring to the aforesaid coupling or tension rods, the invention being represented in the annexed drawing in which Figure 1 is a sectional side elevation showing the improved coupling rod applied to a vehicle, and Fig. 2 is a sectional detail view of said rod.

The coupling or tension rod comprises two members 1 and 1ª connected together by a screw coupling or union 2 which permits of adjusting the effective length thereof. One end of the rod is pivotally connected as at 3 to the bearing of the driving pinion or to any other fixed point of the vehicle frame; and the other end enters a box 4 attached to the wheel axle 5 of the vehicle.

The member 1 of the coupling rod carries an abutment or enlargement 6 located within the box 4 and at each side of said abutment is placed a metallic helical spring 7 and 7ª, one of which 7 bears against the end of the box and the other 7ª against a plug 8 screwed into the opposite end of said box. It will be obvious that said springs will tend to absorb the horizontal shocks imparted to the vehicle axle during traveling. The plug serves at the same time for adjusting the tension of the spring.

What I claim as my invention and desire to secure by Letters Patent of the United States is:—

1. The combination with a vehicle frame and wheel axle of a coupling or tension rod adjustable as to length and having a non-displaceable connection at one end to said frame, and a spring connection between the other end of said rod and the wheel axle aforesaid substantially as described.

2. The combination with a vehicle frame and wheel axle of a coupling or tension rod adjustable as to length and positively connected at one end to said frame, a box connected to said axle into which the other end of the rod enters and a spring within said box adapted to act on said rod substantially as described.

3. The combination with a vehicle frame and wheel axle of a coupling or tension rod adjustable as to length and positively connected at one end to said frame, a box connected to said axle into which the other end of the rod enters, an abutment on said rod within the box, and springs adapted to act against opposite sides of said abutment substantially as described.

4. The combination with a vehicle frame and wheel axle of a coupling or tension rod adjustable as to length and positively connected at one end to said frame, a box connected to said axle into which the other end of the rod enters, an abutment on said rod within the box, a screw plug inserted into the free end of the box and a spring located at each side of the abutment, said spring bearing at one end against said abutment and at the opposite end against the wall of the box and screw plug respectively substantially as described.

In witness whereof I have signed this specification in the presence of two witnesses.

THÉODORE ROMMEL.

Witnesses:
　AUGUSTUS E. INGRAM,
　JOHN BAKER.